(12) United States Patent
Onozawa

(10) Patent No.: US 7,499,097 B2
(45) Date of Patent: Mar. 3, 2009

(54) ELECTRONIC CAMERA EQUIPPED WITH AN AUTOMATIC FOCUSING FUNCTION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 668 days.

(21) Appl. No.: 11/065,311

(22) Filed: Feb. 23, 2005

(65) Prior Publication Data

US 2005/0185086 A1  Aug. 25, 2005

(30) Foreign Application Priority Data

Feb. 25, 2004  (JP)  ............................ 2004-049431

(51) Int. Cl.
*H04N 5/232*  (2006.01)
(52) U.S. Cl. .................. 348/348; 348/349; 348/350; 348/353
(58) Field of Classification Search ................ 348/345, 348/349
See application file for complete search history.

(56) References Cited

U.S. PATENT DOCUMENTS

| | | | | |
|---|---|---|---|---|
| 3,890,626 | A * | 6/1975 | Ettischer | 396/73 |
| 5,210,560 | A * | 5/1993 | Labaziewicz | 396/296 |
| 5,619,297 | A * | 4/1997 | Noguchi | 396/201 |
| 6,351,606 | B1 * | 2/2002 | Yamazaki | 396/61 |
| 6,453,124 | B2 * | 9/2002 | Morimoto et al. | 396/91 |
| 6,549,730 | B1 * | 4/2003 | Hamada | 396/111 |
| 6,941,068 | B2 * | 9/2005 | Matsuda | 396/91 |
| 2003/0012570 | A1 * | 1/2003 | Yoshida et al. | 396/349 |
| 2004/0119852 | A1 * | 6/2004 | Shin | 348/240.2 |

FOREIGN PATENT DOCUMENTS

| | | | |
|---|---|---|---|
| JP | 07-043605 | A | 2/1995 |
| JP | 07-287283 | * | 10/1995 |
| JP | 08-069039 | A | 3/1996 |
| JP | 11-038487 | A | 2/1999 |
| JP | 2000-193879 | A | 7/2000 |
| JP | 2001-141983 | A | 5/2001 |
| JP | 2001-255456 | * | 9/2001 |
| JP | 2001-255456 | A | 9/2001 |
| JP | 2001-281530 | A | 10/2001 |
| JP | 2001-318303 | A | 11/2001 |
| JP | 2002-311328 | A | 10/2002 |
| JP | 2004-012497 | A | 1/2004 |

* cited by examiner

*Primary Examiner*—Ngoc-Yen T Vu
*Assistant Examiner*—Kent Wang
(74) *Attorney, Agent, or Firm*—Frishauf, Holtz, Goodman & Chick, P.C.

(57) ABSTRACT

A user by halfway depressing (S12) a shutter button acquires (S13, S14) the output OR and the output OL of a sensor array. Subsequently, an operation judges whether or not the absolute value of the difference between the output OR and the output OL is greater than a threshold value (S15). When judged greater than a threshold value, an operation initiates a warning notification to the user (S17, S18) and AF processing by a contrast detection method is performed. Meanwhile, when judged less than a threshold value, the focus lens is moved so focus can be performed toward the distance to an object with a phase difference detection method (S20). Then, the focus lens is moved from the existing focus lens position by a narrow range and the focus lens is moved to the lens position constituting the highest contrast value (S21).

17 Claims, 7 Drawing Sheets

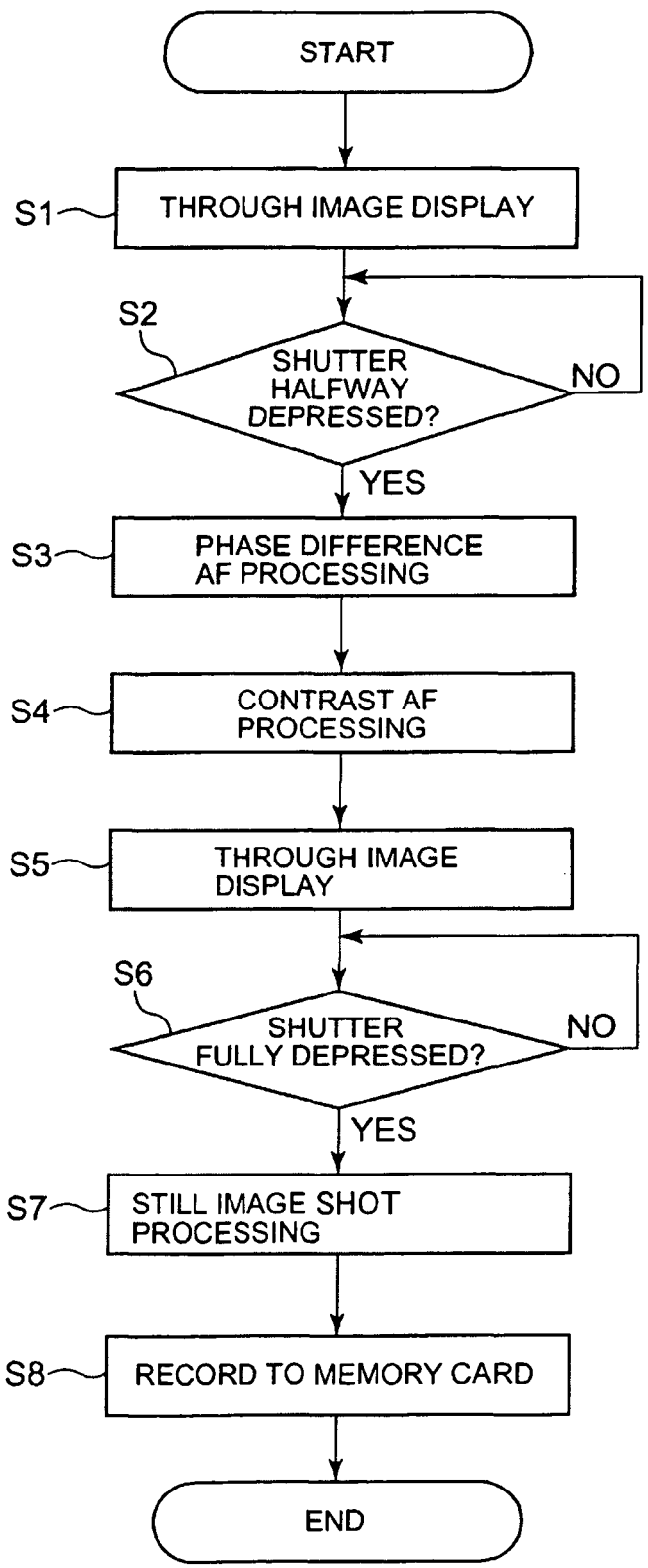

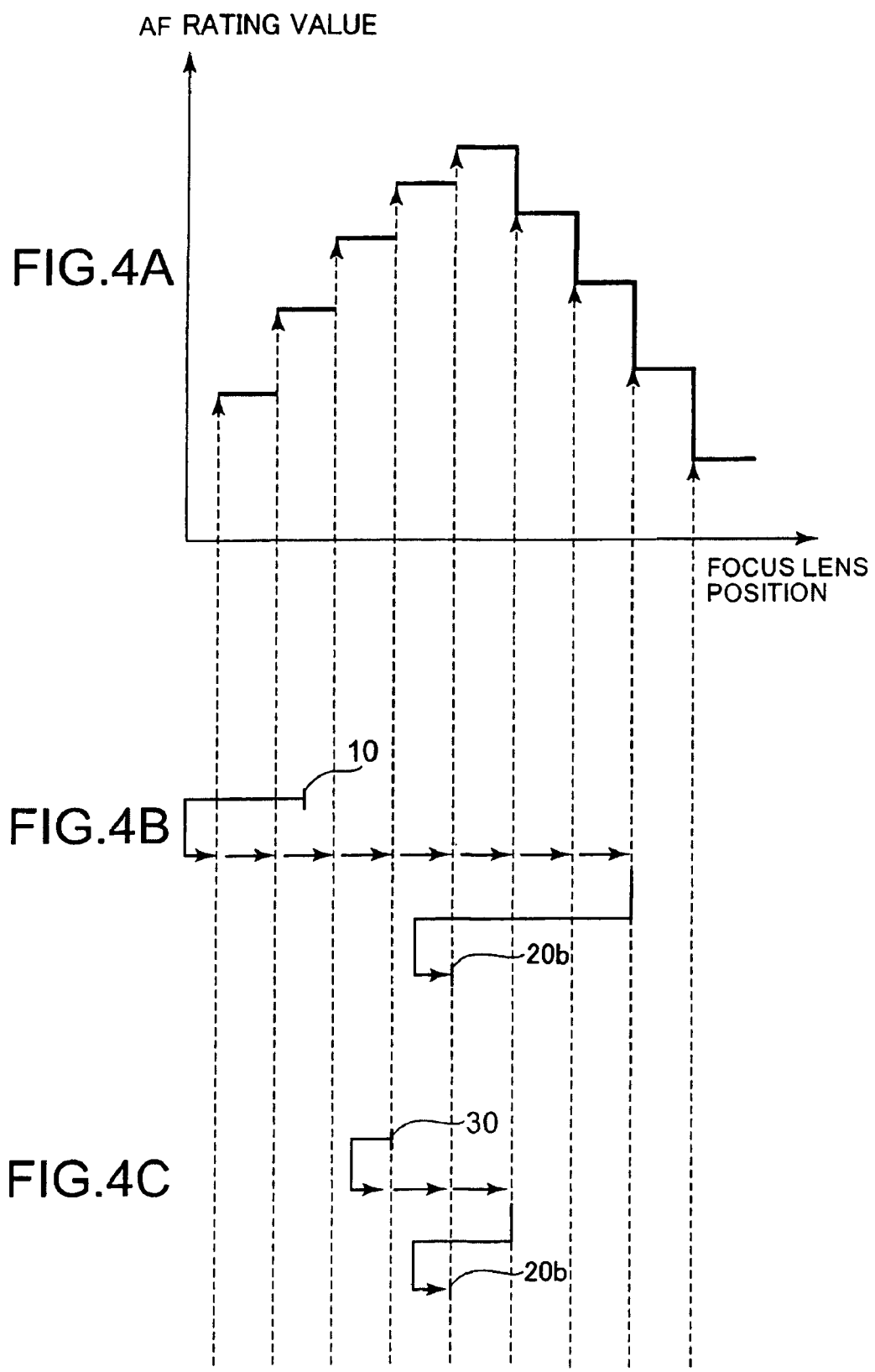

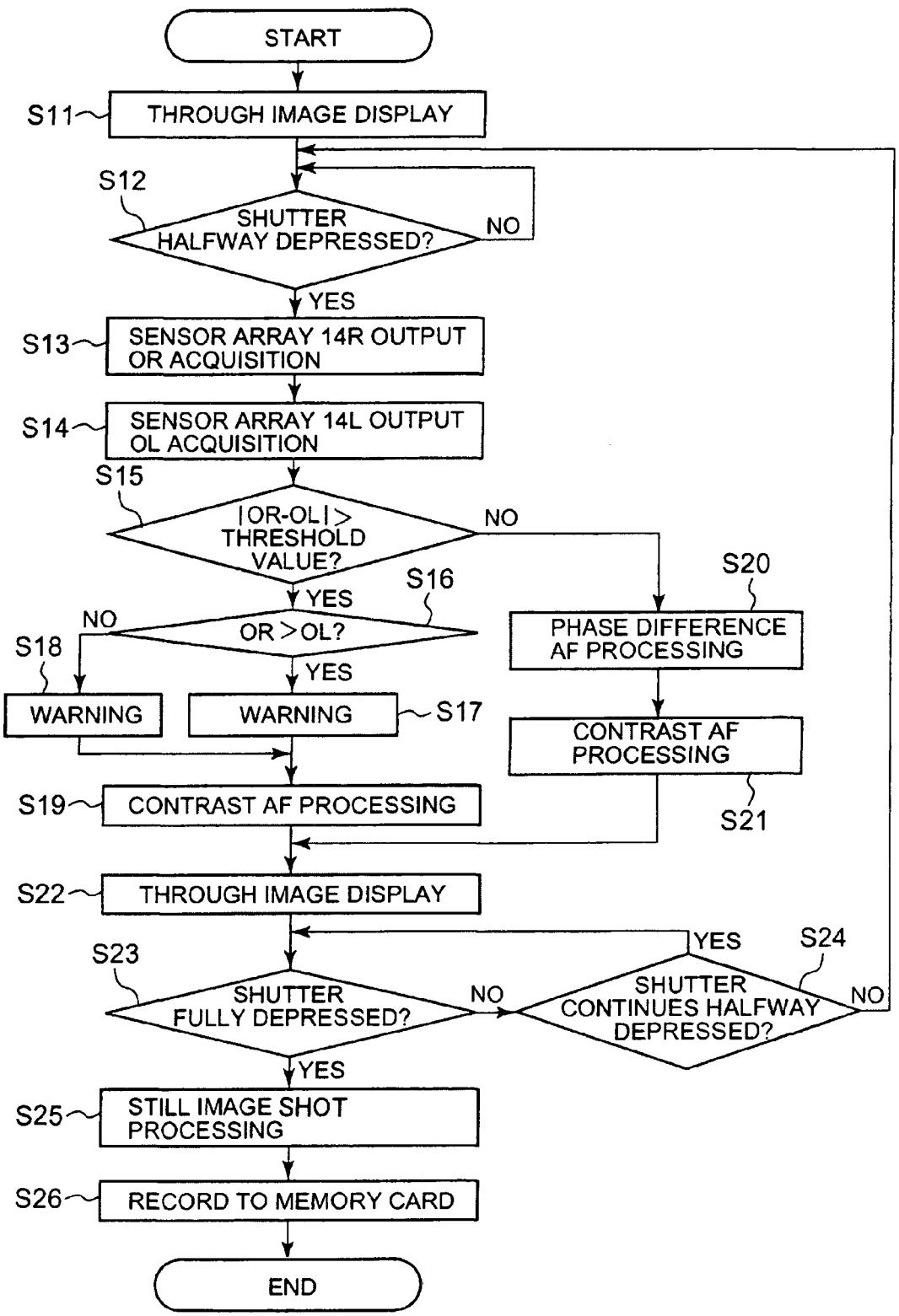

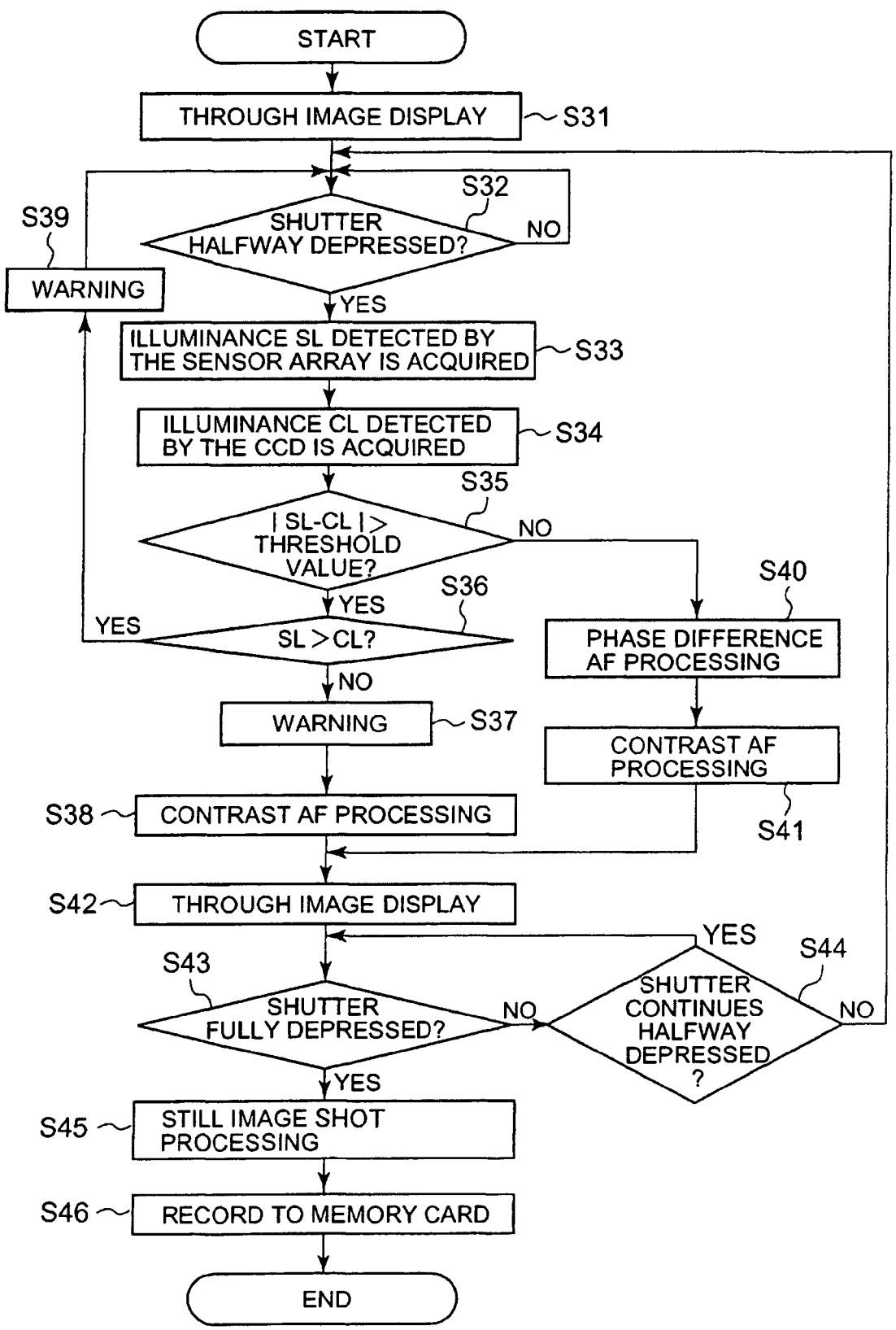

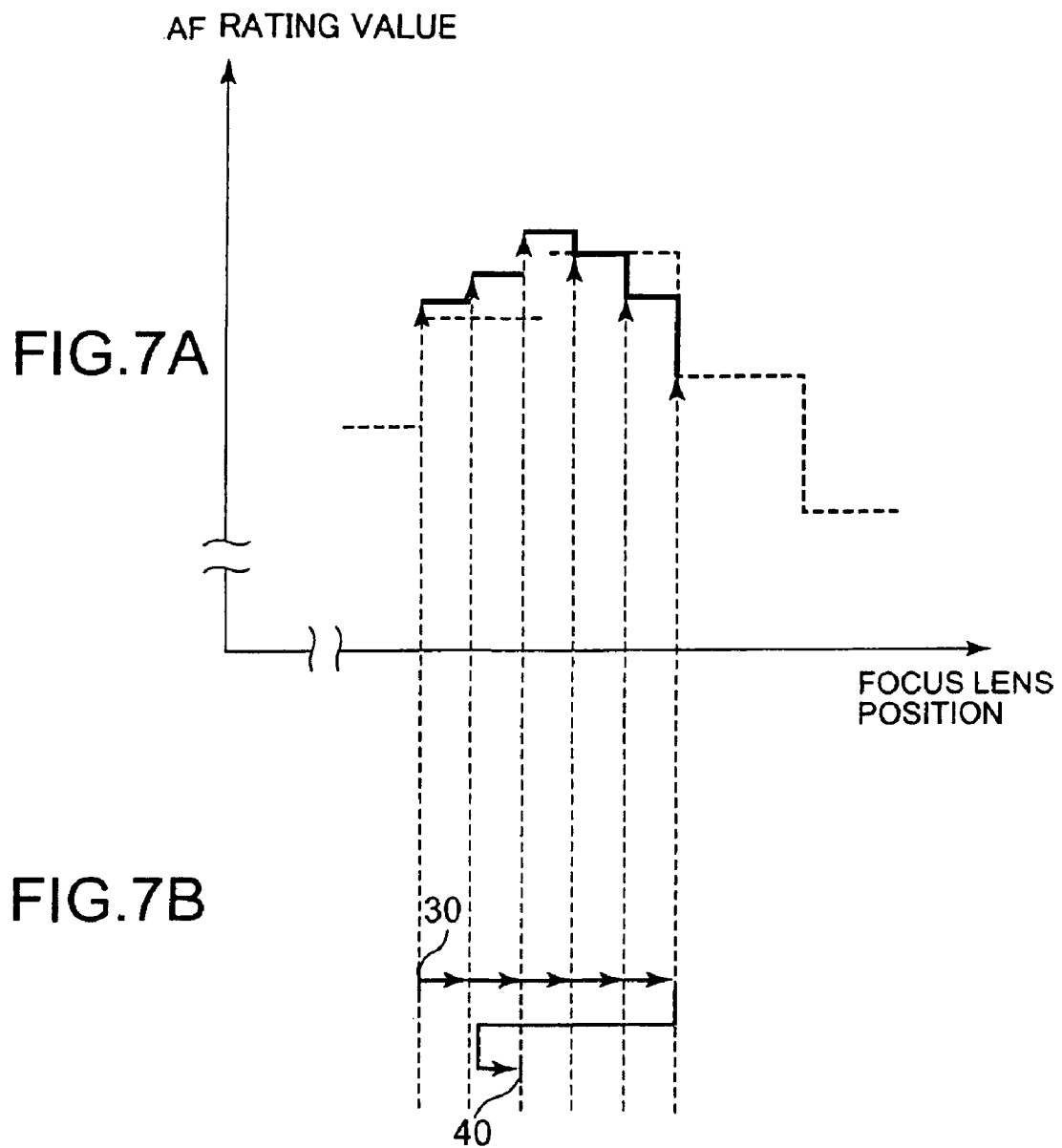

ELECTRONIC CAMERA EQUIPPED WITH AN AUTOMATIC FOCUSING FUNCTION

CROSS-REFERENCE TO RELATED APPLICATION

This application is based upon and claims the benefit of priority from the prior Japanese Patent Application No. 2004-049431, filed Feb. 25, 2004, the entire contents of which is incorporated herein by reference.

BACKGROUND OF THE INVENTION

1. Field of the Invention

The present invention relates to an automatic focusing method and an automatic focusing control function, which for example is configurable for use in a digital camera equipped with an automatic focusing function (commonly abbreviated as "auto focus function" or "AF function").

2. Description of the Related Art

Recently, in step with the advances of digital camera technology, a digital camera with AF functions consistent with a hybrid method (also referred to as a "hybrid system") which jointly utilizes a contrast AF function with a phase difference AF function has begun to appear in the electronic camera industry. Accordingly, AF processing can be performed rapidly with high precision.

In particular, after performing focus lens drive based on a phase difference detection signal by a phase difference detection method and then performing a focus lens drive based on an AF rating value by a contrast detection method, the apparatus is practically in a focused state in an incredibly short time. Furthermore, it is possible to produce a highly precise focus with a contrast detection method.

However, in a conventional digital camera, etc. using AF processing consistent with a hybrid method although a focus state can be rapidly realized and with high precision to shoot an object (take an image of a subject), when the AF sensor (ranging sensor) is obstructed (blocked from the field of view) there is a high probability that the snapshot will be flawed or the image could not be taken in a highly precise focus state.

SUMMARY OF THE INVENTION

The present invention is made in view of such a conventional problem. Thus, even if it is the case where the AF sensor is obstructed, the present invention aims at providing an automatic focusing device and an automatic focus control method in which flawed shooting of image photography is avoidable.

In One Mode:

An automatic focusing device comprising a phase difference detection portion which detects phase difference of an image as a result of image focus performed in a sensor array for ranging; a contrast detection portion which detects a contrast value of a shot image acquired by an image sensor which images an object; a first focus control portion which performs focus relative to an object by driving a focus lens based on a detection result by said phase difference detection portion; a second focus control portion which performs focus relative to an object by driving a focus lens based on a plurality of detection results acquired by said contrast detection portion while driving said focus lens; a judgment portion which judges whether or not said sensor array for ranging is obstructed; and a third focus control portion which prioritizes focus control by said second focus control portion higher than focus control of said first focus control portion when judged by said judgment portion that said sensor array for ranging is obstructed.

Besides, in Another Mode:

An electronic camera comprising a phase difference detection portion which detects phase difference of an image as a result of image focus performed in a sensor array for ranging; an image pickup portion which shoots an object image and outputs a shot image; a recording portion which records a shot image outputted from said image pickup portion; a contrast detection portion which detects a contrast value of a shot image outputted from said image pickup portion; a first focus control portion which performs focus relative to an object by driving a focus lens based on a detection result by said phase difference detection portion; a second focus control portion which performs focus relative to an object by driving a focus lens based on a plurality of detection results acquired by said contrast detection portion while driving said focus lens; a judgment portion which judges whether or not said sensor array for ranging is obstructed; and a third focus control portion which prioritizes focus control by said second focus control portion higher than focus control of said first focus control portion when judged by said judgment portion that said sensor array for ranging is obstructed.

Also, in Another Mode:

An automatic focusing device comprising a phase difference detection portion which detects phase difference of an image as a result of image focus performed in a first sensor array and a second sensor array; a focus control portion which performs focus relative to an object by driving said focus lens based on a detection result by said phase difference detection portion; a first acquisition portion which acquires an output of said first sensor array; a second acquisition portion which acquires an output of said second sensor array; a judgment portion which judges whether or not the difference between an output acquired by said first acquisition portion and an output acquired by said second acquisition portion is greater than a threshold value; and a warning portion which initiates a warning notification to a user when judged to be greater than a threshold value by said judgment portion.

Furthermore, in Another Mode:

An automatic focusing device comprising an image sensor which senses an image of an object; a sensor array for ranging which measures distance to an object; a phase difference detection portion which detects phase difference of an image as a result of image focus performed in said sensor array for ranging; a focus control portion which performs focus relative to an object by driving a focus lens based on a detection result by said phase difference detection portion; a first acquisition portion which acquires illuminance detected by said image sensor for ranging; a second acquisition portion which acquires illuminance detected by said sensor array for ranging; a judgment portion which judges whether or not the difference between illuminance acquired by said first acquisition portion and illuminance acquired by said second acquisition portion is greater than a threshold value; and a warning portion which initiates a warning notification to a user when judged to be greater than a threshold value by said judgment portion.

Besides, in Another Mode:

An automatic focusing device comprising a phase difference detection means for detecting phase difference of an image as a result of image focus performed in a sensor array for ranging; a contrast detection means for detecting a contrast value of a shot image acquired by an image sensor which images an object; a first focus control means for performing focus relative to an object by driving a focus lens based on a detection result by said phase difference detection means; a second focus control means for performing focus relative to an object by driving a focus lens based on a plurality of detection results acquired by said contrast detection means while driving said focus lens; a judgment means for judging whether or not said sensor array for ranging is obstructed; and a third focus control means for prioritizing focus control by said second focus control means higher than focus control of said first focus control means when judged by said judgment means that said sensor array for ranging is obstructed.

Besides, in Another Mode:

An automatic focusing device method includes a judgment step for judging whether or not a sensor array for ranging is obstructed; a third focus control step for prioritizing focus control by a second focus control step higher than a focus control by a first focus control step when judged by the above-mentioned judgment step that the above-mentioned sensor for ranging is obstructed; the above-mentioned first focus control step includes a step for detecting a phase difference of an image as a result of image focus performed in a sensor array for ranging; a step for performing focus relative to an object by driving a focus lens based on the above-mentioned detection result; the above-mentioned second focus control step includes a step for detecting a contrast value of a shot image acquired by an image sensor which images an object; and a step for performing focus relative to an object based on a plurality of detection results by the above-mentioned contrast detection while driving a focus lens.

Lastly, in Other Modes:

A program for executing each of the above-stated processes by a computer includes a phase difference detection process for detecting phase difference of an image as a result of image focus performed in a sensor array for ranging; a contrast detection process for detecting a contrast value of a shot image acquired by an image sensor which images an object; a first focus control process for performing focus relative to an object by driving a focus lens based on a detection result by the above-mentioned phase difference detection process; a second focus control process for performing focus relative to an object by driving a focus lens based on a plurality of detection results acquired by the above-mentioned contrast detection process while driving the above-mentioned focus lens; a judgment process for judging whether or not the above-mentioned sensor array for ranging is obstructed; and a third focus control process for prioritizing focus control by the above-mentioned second focus control process higher than focus control of the above-mentioned first focus control process when judged by the above-mentioned judgment process that the above-mentioned sensor array for ranging is obstructed.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a flow chart showing digital camera operations with an AF function of a hybrid method;

FIG. 4A shows the relationship between the focus lens position and the AF rating value of that focus lens position and FIGS. 4B and 4C show the movement state of the focus lens;

FIG. 5 is a flow chart showing the digital camera operations of the first embodiment;

FIG. 6 is a flow chart showing the digital camera operations of the second embodiment;

FIG. 7A shows the relationship between the focus lens position and the AF rating value of that focus lens position and FIG. 7B shows the movement state of the focus lens.

DETAILED DESCRIPTION OF THE PREFERRED EMBODIMENTS

The preferred embodiments of the present invention will hereinafter be described in detail with reference to the drawings.

First Embodiment

A. Digital Camera Configuration

Figure 1A:
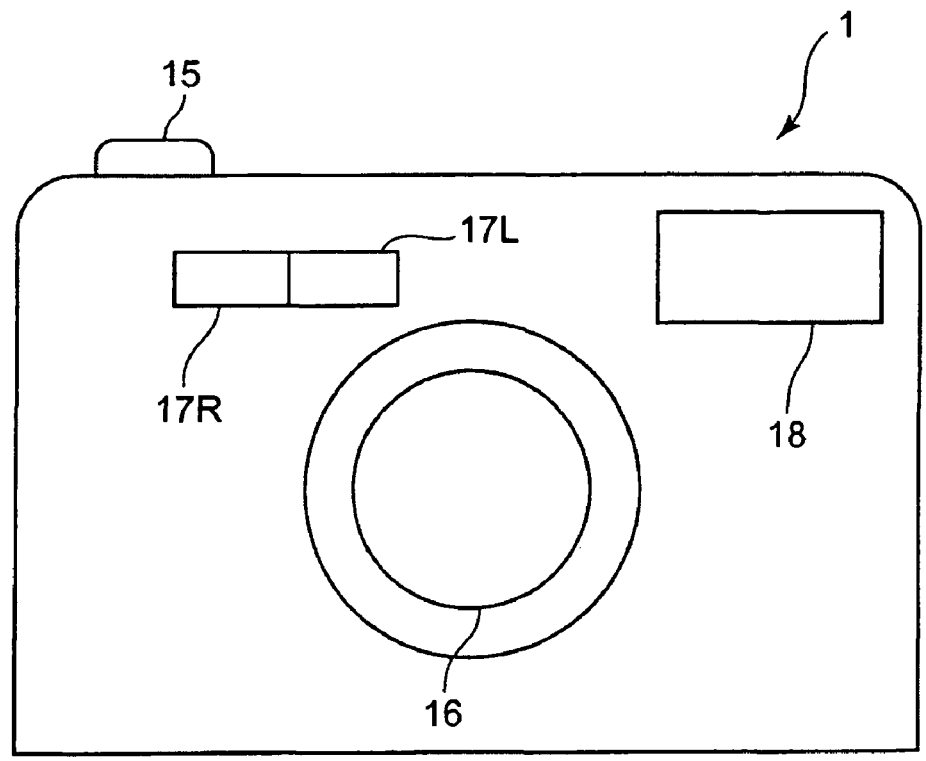
FIG. 1A is an outline view of a digital camera in the embodiment of the present invention and FIG. 1B shows the principle of triangular ranging.

FIG. 1A shows the external outline appearance of a digital camera 1 which actualizes the automatic focusing method of the present invention. The front side of the digital camera 1 is configured with a shooting lens 16, a lens 17 (17R, 17L) for auto focus (AF) and a strobe light section 18. The top side of the digital camera 1 is equipped with a shutter button 15 which can be halfway depressed and fully depressed.

Figure 2:
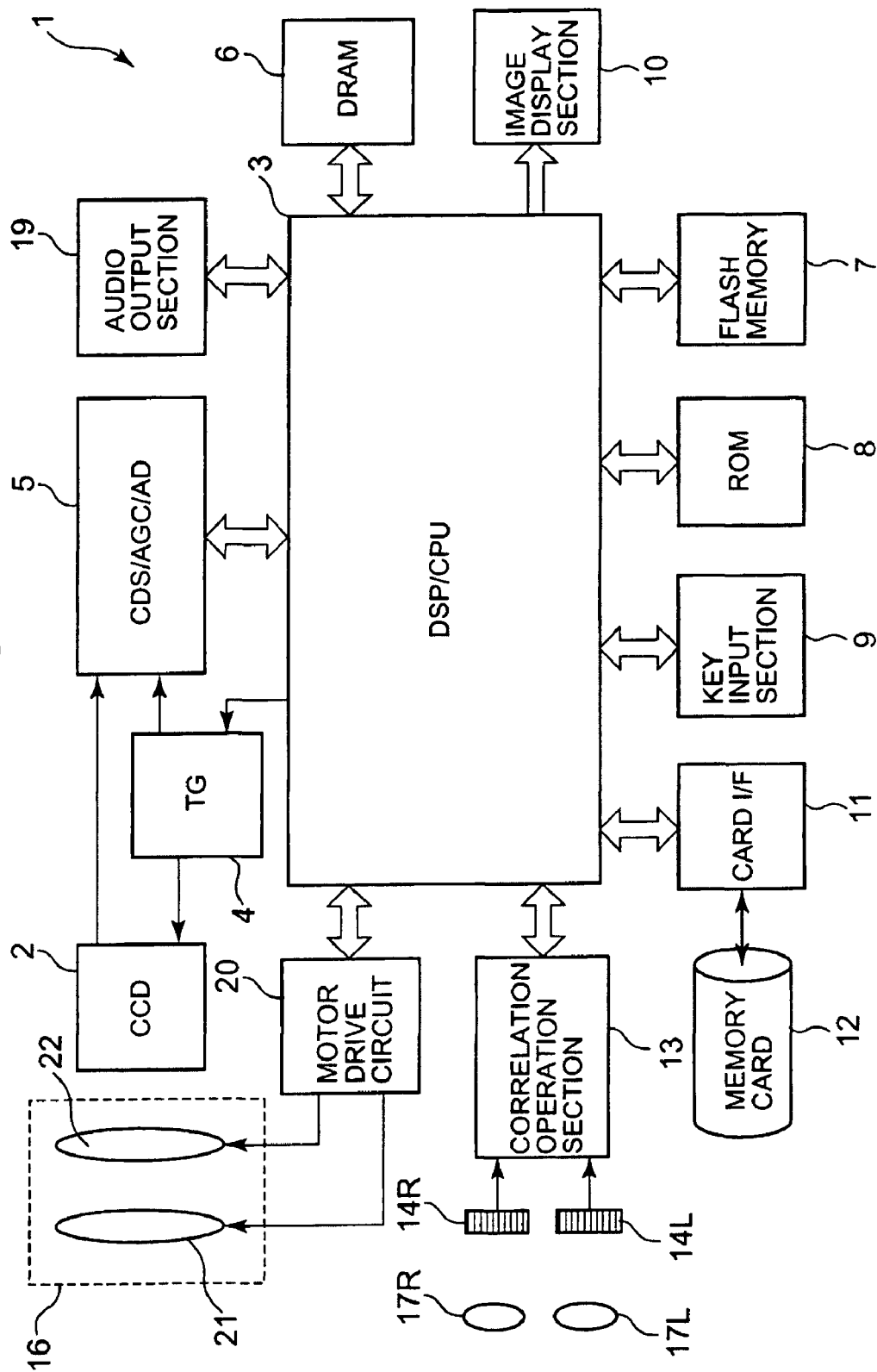
FIG. 2 is a block diagram of a digital camera of an embodiment of the present invention.

FIG. 2 is a block diagram showing the electrical outline configuration of the digital camera 1 which actualizes the automatic focusing method of the present invention.

The digital camera 1 comprises a CCD (Charge-Coupled Device) 2, a DSP/CPU (Digital Signal Processor/Central Processing Unit) 3, a TG (timing generator) 4, a unit circuit 5, a DRAM (Dynamic Random Access Memory) 6, a flash memory 7, a ROM (Read-Only Memory) 8, a key input section 9 (including the shutter button 15), an image display section 10, card I/F 11, correlation operation section 13, a sensor array 14R, a sensor array 14L, the shooting lens 16 (including a focus lens 21 and a zoom lens 22), the lens 17R for AF, the lens 17L for AF, the strobe light section 18 (omitted from diagram), an audio output section 19 and a motor drive circuit 20. The card I/F 11 is connected to a memory card 12 which is removably attachable to the card slot situated in the main body of the digital camera 1 (not shown).

The shooting lens 16 includes the focus lens 21 and the zoom lens 22 which comprise a plurality of lens groups. Also, the motor drive circuit 20 is connected to the shooting lens 16. Thus, the motor drive circuit drives the focus lens 21 and the zoom lens 22 in the direction of the optical axis according to a control signal sent from the DSP/CPU 3.

The CCD 2 (image sensor) performs photoelectric conversion of the projected object and outputs to the unit circuit 5 as an imaging signal. Also, the CCD 2 is driven according to the timing signal of a predetermined frequency generated by the TG 4. The unit circuit 5 is connected to the TG 4. The unit circuit 5 comprises a CDS (Correlated Double Sampling) circuit which performs correlated double sampling of the imaging signal outputted from the CCD 2 and retained, again adjustment amplifier (AGC) which amplifies the imaging signal and an A/D (Analog-to-Digital) converter which converts the imaging signal after amplification into a digital signal. The CCD 2 output signal is then sent to the DSP/CPU 3 as a digital signal through the unit circuit 5.

When in a shooting standby state, the image display section 10 which includes a color LCD and its driver circuit displays the object of an image picked up by the CCD 2 as a through image and, at the time of playback of a recorded image, displays a recorded image which is read out and expanded from the memory card 12 for storage. Besides, a warning display is also initiated (described later).

The key input section 9 outputs a manipulated signal to DSP/CPU 3 corresponding to a user's key strokes, including a plurality of operation keys, such as the shutter button 15, an "Enter" key, a "Cancel" key, a cursor key, etc.

The DRAM 6 while being used as a buffer memory to temporarily store the image data of a digitized object after being picked up by the CCD 2 is also used as a working memory in DSP/CPU 3.

The lens 17R for AF and lens 17L for AF each perform image focus of the light of an object to the sensor array 14R and the sensor array 14L.

The sensor array 14R and the sensor array 14L perform photoelectric conversion of the focused image and outputs an electrical signal to the correlation operation section 13. As the correlation operation section 13 calculates the distance to an object 20a according to the principle of triangular ranging (triangular distance measurement) based on an electrical signal inputted from the sensor array 14R and the sensor array 14L and outputs to DSP/CPU 3, the output OR of the sensor array 14R and output OL of the sensor array 14L and outputs to DSP/CPU 3.

Figure 1B:
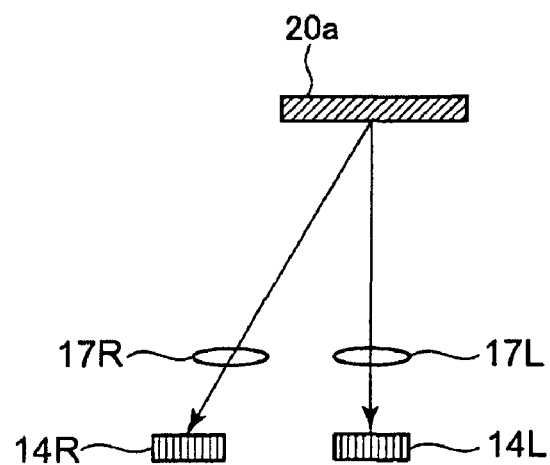

FIG. 1B is a drawing for explaining the triangular ranging principle. When the object 20a is moved closer to the lens 17 the image focus in the sensor array 14 of each image forms at a farther away position. When the object 20a is moved farther from the lens 17 the image focus in the sensor array 14 of each image forms at a closer position. The distance to the object 20a can be obtained by the amount of divergence (phase difference) in the image.

The audio output section 19 includes a built-in microphone, an amplifier, an A/D converter, a built-in speaker, a D/A converter, etc. The audio inputted into the built-in microphone is converted into a digital signal and outputted to the DSP/CPU 3. The digital signal sent from the DSP/CPU 3 is converted into audio and outputs the audio from the built-in speaker. Also, a warning is outputted by audio, etc. (described later).

The DSP/CPU 3 is a one chip microcomputer which controls each section of the digital camera 1 while having various kinds of digital signal processing functions including the processes of compression and expansion of image files.

Specifically, the DSP/CPU 3 is set to the still image shooting mode by manipulation of the user's key input section 9 and an operation judges that the shutter button 15 is halfway depressed. The correlation operation section 13 calculates the distance to the object 20a according to the principle of triangular ranging based on an electrical signal inputted from the sensor array 14R and the sensor array 14L and outputted to the DSP/CPU 3. The distance information to the object 20a inputted from the correlation operation section 13, the output OR of the sensor array 14R and the output OL of the sensor array 14L are stored in the DRAM 6. An operation then judges whether or not the absolute value of the difference between the output OR and the output OL is greater than a threshold value. The feature to judge whether or not the absolute value is greater than this threshold value is equivalent to a judgment means in the present invention.

When an operation judges that the absolute value of the difference between the output OR and the output OL is greater than a threshold value, the DSP/CPU 3 will implement a warning notification to the user. This feature is equivalent to a warning means in the present invention. Specifically, a warning notification (a warning message that the lens 17R for AF and/or the lens 17L for AF are obstructed (blocked from field of view) by a user's hand, the shooting lens 16 hood, etc. (not shown)) is initiated by way of audio output and visibly displayed in the audio output section 19 and the image display section 10. The feature which initiates a warning notification by audio is equivalent to an audio warning means of the present invention. The feature which initiates a warning by visible display is equivalent to a display warning means of the present invention.

In this case, when the absolute value of the difference between the output OR and the output OL is judged to be greater than a threshold value, AF processing by a phase difference detection method based on the phase difference sensor output (distance information to the object stored in the DRAM 6) is nullified and AF processing by a contrast detection method is performed. Basically, the focus lens is shifted from lens end to lens end within the movable range (maximum< >minimum range) and the contrast at that time in the CCD 2 is converted into an electrical signal. The focus lens is adjusted to the lens position which interprets the light wave pattern, that is, the position containing the highest frequency component and AF processing is concluded. When an operation judges the lens for AF 17R, 17L is/are obstructed (if the absolute value of the difference between the output OR and the output OL is judged to be greater than a threshold value), the feature which performs focus relative to an object is equivalent to a third focus control means of the present invention. Also, the feature which detects contrast is equivalent to a contrast detection means of the present invention.

Meanwhile, when an operation judges the absolute value of the difference between the output OR and the output OL is not greater than a threshold value, AF processing according to a hybrid method will be performed. First, AF processing by the phase difference detection method based on the initial phase difference sensor output (distance information to the object stored in the DRAM 6) is performed. Accordingly, the focus lens is moved in order to be in a focused state with the object distance.

Here, contrast AF processing drives the focus lens in a narrow range from the focus lens position moved by the phase difference AF processing and the contrast at that time in the CCD 2 is converted into an electrical signal. The focus lens is adjusted to the lens position which interprets the light wave pattern, that is, the position containing the highest frequency component. Then, AF processing according to a hybrid method is concluded. When an operation judges the lens for AF 17R, 17L is/are obstructed (if the absolute value of the difference between the output OR and the output OL is judged to be less than a threshold value), the feature which performs focus relative to an object is equivalent to a fourth focus control means of the present invention. Also, the feature which detects phase difference of an image by the sensor array 14R and the sensor array 14L is equivalent to a phase difference detection means of the present invention.

Furthermore, the feature which performs focus relative to an object with the phase difference detection method is equivalent to a first focus control means of the present invention. The feature which performs focus relative to an object with the contrast detection method is equivalent to a second focus control means of the present invention.

After AF processing is completed according to the shutter button 15 being halfway depressed, the DSP/CPU 3 will perform still image shot processing when the shutter button 15 is fully depressed. Accordingly, in CCD 2 at relatively lengthy output image pickup timing, the pixel signal in the even lines and the pixel signal in the odd lines of one image screen are sequentially outputted and the data of the entire screen area is taken into the buffer memory (DRAM 6).

Subsequently an image file, such as a JPEG format, etc., is generated from the taken-in image data and the generated image file is recorded on the memory card 12.

In the flash memory 7 and the ROM 8, a control program necessary for each section of the DSP/CPU 3, that is, a program necessary for various kinds of control including AE (auto exposure)/AF (auto focus), etc. and necessary data (threshold value, etc.) are recorded. The DSP/CPU 3 functions as a judgment means, a warning means, an audio warning means, a display warning means, a first focus control means, a second focus control means, a third focus control means, a fourth focus control means and a contrast detection means of the present invention by operating according to the above-mentioned program.

Hereinafter, the operation of the digital camera 1 composed from the above configuration will be explained.

B. Digital Camera 1 Operation

B-1

Before explaining the operation of the digital camera 1 in an embodiment of the present invention, the operation of a digital camera with an AF function of a hybrid method will be explained according to the FIG. 3 flow chart.

When set to a still image shooting mode by manipulation of the user's key input section 9, image pickup by the CCD 2 is started at Step S1 and a through image of an object will be displayed in the image display section 10.

Next, an operation judges whether or not the shutter button 15 is halfway depressed at Step S2. When the shutter button 15 is halfway depressed, the operation advances to Step S3. When not pressed, the operation stops at Step S2 until the shutter button 15 is pressed and a through image display is continued.

When the operation advances to Step S3, phase difference AF processing is performed. In the AF processing of this phase difference detection method, initially the correlation operation section 13 is based on an image in which the light of an object forms an image focus with the lens 17R for AF through the sensor array 14R and the light of an object forms an image focus with the lens 17L for AF through the sensor array 14R. The distance to an object is calculated according to the principle of triangular ranging. Then, the DSP/CPU 3 shifts the focus lens in order to be in a focus state at that calculated distance. At this point, when the distance to an object is close, the image focus is performed at a relatively distant position and when the distance to an object is far, the image focus location of the two images is relatively near.

When phase difference AF processing (AF processing by a phase difference detection method) is accomplished, the operation advances to Step S4 and contrast AF (AF processing by a contrast detection method) is performed. Here, contrast AF processing drives the focus lens in a narrow range from the focus lens position moved by the phase difference AF processing and the contrast at that time in the CCD 2 is converted into an electrical signal. The focus lens is adjusted to the lens position which interprets the light wave pattern, that is, the position containing the highest frequency component.

FIG. 4A is a diagram showing the relationship between the focus lens position and the AF rating value (contrast value) of that focus lens position.

FIG. 4B is a diagram showing the movement state of the focus lens in the case of only the contrast AF. In this instance, the focus lens is shifted from lens end to lens end (maximum< >minimum) within the movable range (namely, until the peak position is detected). The focus state is set by moving the focus lens to the location of position 20b, namely, the position of the highest AF rating value (contrast value). The position 10 shows the location of the focus lens when starting contrast AF processing.

However, based on AF processing utilizing a hybrid method, since movement of the focus lens to some extent is performed in the vicinity of the focal point by the phase difference detection method, it is not necessary to perform an operation to shift the focus lens from lens end to lens end. What is necessary is just to move the focus lens in a narrow range as shown in FIG. 4C. The position 30 shows the location of the focus lens when made a focus state by the phase difference detection method. The position 20b shows the location of the focus lens when made a focus state by the contrast detection method.

When contrast AF processing is performed, the operation will advance to Step S5 and a through image of an object will be displayed in the image display section 10.

When the image of an object is displayed, the operation will advance to Step S6 and judge whether or not the shutter button 15 is fully depressed. When the shutter button 15 is not fully depressed, the operation stops at Step S6 until it is fully depressed and advances to Step S7.

When the operation advances to Step S7, still image shot processing is performed. Here, in CCD 2 at relatively lengthy output image pickup timing, the pixel signal in the even lines and the pixel signal in the odd lines of one image screen are sequentially outputted to CCD 2 and the data of the entire screen area is taken into the buffer memory (DRAM 6).

Next, the operation advances to Step S8 and an image file, such as a JPEG format, etc., is generated from the taken-in image data and the image file generated via card I/F 11 is recorded on the memory card 12.

B-2

Next, the operation of the digital camera 1 in the first embodiment will be explained according the FIG. 5 flow chart.

When set to a still image shooting mode by manipulation of the user's key input section 9, the image pickup by the CCD 2 is started at Step S11 and a through image of an object will be displayed in the image display section 10.

Next, the operation judges whether or not the shutter button 15 is halfway depressed at Step S12. When the shutter button is halfway depressed, the operation advances to Step S13. When the shutter button 15 is not halfway depressed, the operation stops at Step S12 until the shutter button 15 is pressed and a through image display is continued.

When the operation advances to Step S13, the output OR of the sensor array 14R is acquired. At Step S14, the output OL of the sensor array 14L is acquired.

Subsequently, the operation advances to Step S14 and judges whether or not the difference between the absolute value of the output OR of the sensor array 14R and the output OL of the sensor array 14L is greater than a threshold value.

When the absolute value of the difference between outputs is greater than a threshold value, the operation judges the sensors as obstructed and advances to Step S16. When the absolute value of the difference between outputs is less than a threshold value, the operation judges the sensors as normal and advances to Step S20.

For example, when a user holding the digital camera 1 obstructs lens 17R for AF with his/her hand, the amount of light received by the sensor array 14R is naturally lessened and in turn the amount of light applied to the output OR of the sensor array 14R is lower. Additionally, when the lens 17L for AF is obstructed with the shooting lens 16 hood, etc., the amount of light received by the sensor array 14L becomes lessened and when applied to the output OL of the sensor array 14L is lower.

When the operation advances to Step S16, the operation judges whether or not the output OR is greater than the output OL. When the output OR is greater than the output OL, the operation judges that the lens 17L for AF is obstructed with the user's shooting lens 16 hood, etc. Subsequently, the operation advances to Step S17 and initiates a warning notification to the user. This warning is initiated both as an audio output and a visual display, for example, "the shooting lens is obstructed" by the hood etc. to the audio output section 19 and the image display section 10.

Meanwhile, when the output OR is less than the output OL, the operation judges that the lens 17R for AF is obstructed by a user's hand, etc. Accordingly, the operation advances to Step S18 and initiates a warning notification to the user. This warning is initiated both as an audio output and a visual display, for example, "the AF sensor is obstructed" by a hand, etc. to the audio output section 19 and the image display section 10.

In addition, warning beeps, etc. are acceptable though the audio is output from the audio output section 10. In short, some type of warning notification which draws attention to the user is sufficient.

When a warning is issued at Step S17 or Step S18, these operations advance to Step S19. Contrast AF processing is accomplished without performing phase difference AF processing based on the distance to an object which the correlation operation section 13 calculates with the output OR and the output OL acquired at Step S13, S14. In this instance as shown in FIG. 4B, the focus lens is shifted from lens end to lens end within the movable range and the contrast at that time in the CCD 2 is converted into an electrical signal. The focus lens is adjusted to the lens position which interprets the light wave pattern, that is, the position containing the highest frequency component.

Because the lens 17R for AF is obstructed by a user's hand, etc. appropriate AF processing cannot be performed according to phase difference AF processing.

On the other hand, when the absolute value of the difference between the output OR and the output OL is less than a threshold value at Step S15, the operation judges that the lens 17R for AF and the lens 17L for AF are not obstructed by a user's hand, etc. The operation advances to Step S20 and phase difference AF processing based on the distance to an object which the correlation operation section 13 calculates with the output OR and the output OL acquired at Step S13, S14 is performed.

Next, the operation advances to Step S21 and contrast AF processing is performed. Here as shown in FIG. 4C, contrast AF processing drives the focus lens in a narrow range from the focus lens position in which movement is performed in the vicinity of the focal point by phase difference AF processing and the contrast at that time in the CCD 2 is converted into an electrical signal. The focus lens is adjusted to the lens position which interprets the light wave pattern, that is, the position containing the highest frequency component.

Accordingly, at Step S15 when the difference of the output OR and the output OL are judged less than a threshold value, AF processing of a hybrid method is performed.

When AF processing according to a hybrid method or a contrast detection method is completed, the operation advances to Step S22 and a through image of an object is displayed in the image display section 10.

Subsequently, the operation advances to Step S23 and judges whether or not the shutter button 15 is fully depressed. When the shutter button is fully depressed, the operation advances to Step S25. When the shutter button 15 is not fully depressed, the operation advances to Step S24 and judges whether or not the shutter button 15 is halfway depressed and continues. When the shutter button 15 is halfway depressed continuously, the operation returns to Step S23. When the shutter button 15 being halfway depressed is released, AF processing is cancelled and the operation returns to Step S12. When a user recognizes a warning sound outputted from the audio output section 19 and a warning notice is displayed in the image display section 10 indicating the operation judged the AF sensors as obstructed, the halfway depressed shutter button 15 may be cancelled in order to perform AF processing again.

When the operation advances to Step S25, still image shot processing is performed. At Step S26, an image file, such as a JPEG format, etc., is generated from the image data acquired by the still image shot processing and recorded on the memory card 12.

C. In the first embodiment mentioned above, when the difference of the outputs of the sensor array 14R and the sensor array 14L by the phase difference detection method is greater than a threshold value, after a warning notification AF processing by a contrast detection method is performed. When the absolute value of the difference of the outputs of the sensor array 14R and the sensor array 14L is less than a threshold value, since a hybrid method utilizing a phase difference detection method and a contrast detection method performs AF processing, even when the lens 17R for AF and the lens 17L for AF are obstructed by a user's hand, etc. appropriate AF processing can be performed. Thus, a brilliant and suitably focused image can be recorded without shooting a flawed snapshot.

Since AF processing according to a hybrid method is performed when the lens 17R for AF and the lens 17L for AF are not obstructed, AF processing can be performed rapidly with high precision.

Moreover, since the operation initiates a warning notification when the lens for AF 17R, 17L are obstructed, the user can realize the sensor arrays 14R, 14L is/are obstructed by a hand, etc.

Second Embodiment

Next, the second embodiment will be explained.

The second embodiment is a digital camera which employs an AF processing function according to a hybrid method, wherein appropriate AF processing is performed by the operation judging whether or not the difference between the illuminance (light intensity) detected by the sensor array and the illuminance detected by the CCD 2 is greater than a constant threshold value.

D. Digital Camera 1 Configuration

The second embodiment also actualized the automatic focusing device of the present invention by using the digital camera 1 which has the same composition as the apparatus shown in FIG. 1.

The digital camera 1 in the second embodiment configuration features differ with the first embodiment in the following points.

When the DSP/CPU 3 judges that the shutter button 15 is halfway depressed, the illuminance detected by the sensor array 14 and the illuminance detected by the CCD 2 are stored in the DRAM 6. The illuminance detected by the sensor array 14 is the averaged illuminance of the illuminance detected by the sensor array 14R and the illuminance detected by the sensor array 14L.

Then, the DSP/CPU 3 discriminates whether or not the absolute value of the difference between the illuminance detected by the sensor array 14 and the illuminance detected by the CCD 2 is greater than a threshold value. This feature is equivalent to the first discrimination means of the present invention.

When the absolute value is discriminated (when the lens 17R, 17L for AF is/are not obstructed) as greater than a threshold value, AF processing according to a hybrid method utilizing a phase difference detection method and a contrast detection method is commenced (the fourth focus control means).

Meanwhile, when the absolute value is greater than a threshold value, the operation judges whether or not the illuminance detected by the sensor array 14 is less than the illuminance detected by the CCD 2. This feature is equivalent to the second discrimination means of the present invention.

When the illuminance detected by the sensor array 14 is judged as less than the illuminance detected by the CCD 2, the operation judges that the sensor array is obstructed (when lens 17R, 17L for AF is/are obstructed). An audio output such as announcing the "AF sensor is obstructed" and a visual display is initiated by the audio output section 19 and the image display section 10 to provide a warning notification to the user (an audio warning means and a display warning means) and AF processing according to a contrast detection method is performed (the third focus control means).

Meanwhile, when the illuminance detected by the sensor array 14 is judged as greater than the illuminance detected by the CCD 2, the operation judges that the shooting lens 16 is obstructed. A through image of an object is displayed in the image display section 10 without performing AF processing and still image shot processing and instead performs audio output stating "the shooting lens is obstructed" by the hood etc. and the display to the image display section 10 to warn to the user (the audio warning means and the display warning means). Since the shooting lens 16 is obstructed by the hood, etc., this will naturally result in a flawed snapshot (the image of an object is not acquired).

After AF processing is completed according to the shutter button 15 being halfway depressed, the DSP/CPU 3 will perform still image shot processing when the shutter button 15 is fully depressed. An image file, such as a JPEG format, etc., is generated from the image data acquired by the still image shot processing and the image file is recorded on the memory card 12.

E. Digital Camera 1 Operation

Next, the operation of the digital camera 1 in the second embodiment will be explained according the FIG. 6 flow chart and FIGS. 4A~4C.

When set to a still image shooting mode by manipulation of the user's key input section 9, the image pickup by the CCD 2 is started at Step S31 and a through image of an object will be displayed in the image display section 10.

Next, the operation judges whether or not the shutter button 15 is halfway depressed by the user at Step S32. When the shutter button 15 is halfway depressed, the operation advances to Step S33. When the shutter button 15 is not halfway depressed, the operation stops at Step S32 until the shutter button 15 is pressed and a through image display is continued.

At Step S33, the illuminance SL detected by the sensor array 14 is acquired. The illuminance SL detected by the sensor array 14 is the averaged illuminance of the illuminance detected by the sensor array 14R and the illuminance detected by the sensor array 14L.

Next, the operation advances to Step S34 and the illuminance CL detected by the CCD 2 is acquired.

Here, the illuminance detected by the sensor array 14R, 14L is the charge amount representing the light of an object which is converted to an electrical charge by the CCD 2.

Then, the operation advances to Step S35 and judges whether or not the absolute value of the difference between the illuminance CL and the illuminance SL acquired is greater than a threshold value.

When the absolute value is greater than a threshold value and the operation judges that the lens for AF 17R, 17L which perform the image focus of the light of an object to the sensor array 14R, 14L is/are obstructed by a user's hand, etc. or that the shooting lens 16 is obstructed by the hood, etc., the process advances to Step S36. Meanwhile, when the absolute value is not greater than a threshold value, the operation judges that the lens 17R, 17L for AF and the shooting lens 16 are not obstructed. The operation then advances to Step S40 in order to perform AF processing of a hybrid method.

When the absolute value is greater than a threshold value and advances to Step S36, the operation judges whether or not the illuminance SL detected by the sensor array 14 is greater than the illuminance CL detected by the CCD 2.

When the illuminance SL is not greater than the illuminance CL due to the lens 17R for AF and the lens 17L for AF being obstructed, the operation judges that the illuminance of the sensor array 14R and the sensor array 14L is less and the operation advances to Step S37.

Meanwhile, due to the shooting lens 16 being obstructed by the hood, etc., when the illuminance SL is greater than the illuminance CL, the operation judges that the illuminance of the CCD 2 is less and the operation advances to Step S39.

When the operation judges that the illuminance SL is not greater than the illuminance CL at Step S36 (branches to "NO"), the operation advances to Step S37 to initiate a warning notification. This warning is initiated both as an audio output and a visual display, for example, "the AF sensor is obstructed" by a hand, etc. to the audio output section 19 and the image display section 10 to attract the attention of the user. In addition, warning beeps, etc. are acceptable though the audio is output from the audio output section 10. In short, some type of warning notification which draws attention to the user is sufficient.

Next, the operation advances to Step S38 and contrast AF processing is accomplished without performing phase difference AF processing based on the distance to an object which the correlation operation section 13 calculates with the output OR and the output OL acquired at Step S33. Since the sensor is obstructed, the appropriate AF processing cannot be performed in the phase difference detection method. In the AF processing shown in FIG. 4B, the focus lens is shifted from lens end to lens end (maximum< >minimum) within a movable range (namely, until the peak position is detected) and the contrast at that time in the CCD 2 is converted into an electrical signal. The focus lens is adjusted to the lens position which interprets the light wave pattern, that is, the position containing the highest frequency component and AF processing is concluded.

Meanwhile, when the operation judges the illuminance SL is greater than the illuminance CL at Step S36 (branches to "YES"), the operation advances to Step S39 to initiate a warning notification. This warning is initiated both as an audio output and a visual display, for example, "the shooting lens is obstructed" by the hood, etc. to the audio output section 19 and the image display section 10 to attract the attention of the user. In addition, warning beeps, etc. are acceptable though the audio is output from the audio output section 10. In short, some type of warning notification which draws attention to the user is sufficient.

Then, the operation returns to Step S32 and a through image of an object is displayed in the image display section 10. Due to the shooting lens 16 being obstructed by the hood, etc., the image an object is not reflected even if shooting is performed. Even if a picture is taken and only half of the image is reflected, the remaining half becomes a flawed snapshot, for example, a pitch black image.

Meanwhile, when the absolute value of the difference between the illuminance SL and the illuminance CL is less than a threshold value at Step S35 (branches to "NO"), the operation judges that the lens 17R for AF and the lens 17L for AF and the shooting lens 16 are not obstructed. The operation advances to Step S40 in order to perform AF processing according to a hybrid method. Phase difference AF processing based on the distance to an object which the correction operation section 13 calculates by the output OR and the output OL acquired at Step S33 is performed.

Then, the operation advances to Step S41 and contrast AF processing is performed. Here, contrast AF processing shifts the focus lens in a narrow range from the focus lens position moved by the phase difference AF processing. The focus lens is adjusted to the lens position containing the highest frequency component and AF processing is concluded.

When AF processing is performed by either Step S38 or Step S41, the operation will advance to Step S42 and a through image of an object will be displayed in the image display section 10.

Next, the operation advances to Step S43 and judged whether or not the shutter button 15 is fully depressed. When the shutter button 15 is fully depressed, the operation advances to Step S45. When the shutter button 15 is not fully depressed, the operation advances to Step S44 and judged whether or not the shutter button 15 is halfway depressed and continues. When the shutter button 15 is halfway depressed continuously, the operation returns to Step S43. When the shutter button 15 being halfway depressed is released, AF processing is cancelled and the operation returns to Step S32. When a user recognizes a warning sound outputted from the audio output section 19 and a warning notice is displayed in the image display section 10 indicating the operation judged the AF sensors as obstructed, the halfway depressed shutter button 15 may be cancelled in order to perform AF processing again.

When the operation advances to Step S45, still image shot processing is performed. At Step S46, an image file, such as a JPEG format, etc., is generated from the image data acquired by the still image shot processing and recorded on the memory card 12.

F. The illuminance detected by the sensor array 14 in the second embodiment as described above, when the absolute value of the difference in illuminance detected by the CCD 2 is greater than a threshold value, the operation judges whether either the illuminance of the sensor array 14 or the illuminance of the CCD 2 is greater. When the illuminance of the sensor array 14 is greater, after a warning notification, a through image is displayed. When the illuminance of the CCD 2 is greater, since contrast AF is performed after a warning notification, even when the lens 17R for AF and the lens 17L for AF are obstructed by a user's hand, the shooting lens 16 hood, etc. appropriate AF processing can be performed. Thus, a brilliant and suitably focused image can be recorded without shooting a flawed snapshot.

Since AF processing according to a hybrid method is performed when neither the lens 17 nor the shooting lens 16 is obstructed, AF processing can be performed rapidly with high precision.

Moreover, since the operation initiates a warning notification when the lens for AF 17R, 17L are obstructed, the user can realize the sensor arrays 14R, 14L is/are obstructed by a hand, etc.

[Modifications]

As a modified example, the following modes are also possible.

(1) In the first embodiment, when the absolute value of the difference between the output OR of the sensor array 14R and the output OL of the sensor array 14L is greater than a threshold value, AF processing is only performed by a contrast detection method. However, after performing focus relative to an object to some extent by AF processing of a phase difference detection method, the operation may be made to perform AF processing of a contrast method. In this case, it is not necessary to perform shifting of the focus lens from lens end to lens end, when the lens 17R, 17L for AF is/are not obstructed. That is, it is only necessary to enlarge the contrast search range (moving range of the focus lens) when the absolute value of the difference between the output OR and the output OL is judged to be less than the threshold value.

Accordingly, the moving range of the focus lens is narrower than the moving range (range from lens end to lens end) shown in FIG. 4B and becomes greater than the moving range shown in FIG. 4C.

Additionally, in the second embodiment at Step S35 of FIG. 6, the operation judges whether or not the absolute value of the difference between the illuminance SL detected by the sensor array 14 and the illuminance CL detected by the CCD 2 is greater than a threshold value. When judged at Step S36 that the illuminance CL is greater than the illuminance SL, only the contrast detection method is made to perform AF processing. Since focus relative to an object is performed to some extent by AF processing of a phase difference detection method like the above, the operation may be made to perform AF processing of a contrast detection method.

(2) Also, in the first and second embodiments, the user beforehand determines whether to perform AF processing by only a contrast detection method or to perform AF processing by only a phase difference detection method. In the case where a phase difference detection method is selected, when the obstruction of the lens 17R, 17L is detected, the operation may be made to perform AF processing by a contrast detection method.

(3) Further, in the first and second embodiments, the operation may automatically select suitable AF processing from within AF processing by a phase difference detection method, AF processing by a contrast detection method or AF processing by a hybrid method corresponding to the shooting conditions (bright or dark shooting location, macro mode, zoom amount, etc.).

For instance, when a macro mode is set, AF processing by a contrast detection method may be preferentially selected or when a zoom amount is set to the "WIDE" position, it may be possible to preferentially select AF processing by a contrast detection method.

In the case where AF processing by a phase difference detection method is automatically selected, when the lens 17R, 17L are obstructed the operation may be made to perform AF processing by a contrast detection method.

(4) Besides, in the first embodiment when a through image is displayed, namely, before the shutter button 15 is halfway depressed, the operation may be made to judge whether the lens 17R, 17L are obstructed. Accordingly, when the operation judges that the lens 17R, 17L for AF are obstructed and the shutter button 15 is halfway depressed, AF processing by a contrast detection method can be immediately performed.

Also, in the second embodiment when judging beforehand whether or not the absolute value of the difference between the illuminance SL of the sensor array 14 and the illuminance CL of the CCD 2 is greater than a threshold value and further judged greater than a threshold value before the shutter button 15 is halfway depressed, the operation may be made to judge which direction of the illuminance SL and the illuminance CL is greater.

Accordingly, when the operation judges that the lens 17R, 17L for AF are obstructed and the shutter button 15 is halfway depressed, AF processing by a contrast detection method can be immediately performed.

(5) Also in the first and second embodiments as shown in FIG. 4B and FIG. 4C, the one time movement amount (one step amount) of the focus lens in the contrast AF processing by a hybrid method and the AF processing of only a contrast detection method are equivalent. As for the contrast AF by a hybrid method as shown in FIG. 7B, the one time movement amount of the focus lens may be made smaller in order to perform highly precise AF processing. That is to say, contrast is minutely searched.

FIG. 4C and FIG. 7B correspond and both positions 30 are by AF processing of a phase difference detection method. The location of the focus lens when establishing a focus state is shown. The positions 20 and 40 show the location of the focus lens when establishing a focus state by a contrast detection method. In comparison to identify with these diagrams, the locations of the focus lens of position 20 b and position 40 differ slightly. The AF rating value of the position 40 is higher than the position 20b somewhat and the one time movement amount of the focus lens differs. In addition, FIG. 7A is a diagram showing the relationship between the focus lens position and the AF rating value of the focus lens position. The dotted line section is a simplified illustration showing the AF rating value in the focus lens position of FIG. 4A.

(6) Likewise, it is possible that the modified examples (1) through (5) mentioned above may be combined. Furthermore, when judged that the lens 17R, 17L is obstructed, the operation performs either the warning process or changes processing of the AF method. It is possible that only warning process or only changes processing of the AF method is executed.

For example, when executing only a warning process and after a user verifies the warning, the obstruction to the AF sensors or the shooting lens can be canceled. Subsequently, by executing still image shot processing a flawed picture can be avoided.

Also, when it is judged that the lens 17R, 17L is not obstructed, the operation is made to perform AF processing of a hybrid method. However, the operation may be made to perform focus relative to an object only by AF processing according to a contrast detection method.

Finally, the automatic focusing device in each of the above-mentioned embodiments is not limited to the described embodiment. A camera mobile phone (cellular phone), a Personal Digital Assistant (PDA), a personal computer, etc. are each suitable. Basically, any apparatus which can perform focus of an object is satisfactory for employing the present invention.

While the present invention has been described with reference to the preferred embodiments, it is intended that the invention be not limited by any of the details of the description therein but includes all the embodiments which fall within the scope of the appended claims.

What is claimed is:

1. An automatic focusing device comprising:
   a phase difference detection portion which detects phase difference of an image by a sensor array for ranging;
   a contrast detection portion which detects a contrast value of an image acquired by an image sensor which images an object;
   a first focus control portion which performs focusing relative to the object by driving a focus lens based on a detection result by said phase difference detection portion;
   a second focus control portion which performs focusing relative to the object by driving the focus lens based on a plurality of detection results acquired by said contrast detection portion while driving said focus lens;
   a judgment portion which judges whether or not said sensor array for ranging is obstructed; and
   a third focus control portion which prioritizes focus control by said second focus control portion higher than focus control by said first focus control portion when said judgment portion judges that said sensor array for ranging is obstructed.

2. The automatic focusing device according to claim 1, wherein said sensor array for ranging comprises a first sensor array and a second sensor array; and
   wherein said judgment portion judges whether or not a difference between an output of said first sensor array and an output of said second sensor array is greater than a threshold value, and said judgment portion judges that said sensor array for ranging is obstructed when the difference between the output of said first sensor array and the output of said second sensor array is judged to be greater than the threshold value.

3. The automatic focusing device according to claim 2, further comprising a warning portion which initiates a warning notification to a user;
   wherein said warning portion initiates a warning notification that said sensor array for ranging is obstructed to the user when said sensor array for ranging is judged to be obstructed by said judgment portion.

4. The automatic focusing device according to claim 3, wherein said warning portion includes at least one audio warning portion which initiates a warning by audio and a display warning portion which initiates a warning by visual display.

5. The automatic focusing device according to claim 3, further comprising a discrimination portion which discriminates whether or not an output of said first sensor array is less than an output of said second sensor array;
   wherein said warning portion initiates a warning notification that said first sensor array is obstructed when the output of said first sensor array is discriminated as being less than the output of said second sensor array by said discrimination portion; and
   wherein said warning portion initiates a warning notification that said second sensor array is obstructed when the output of said first sensor array is discriminated as being greater than the output of said second sensor array by said discrimination portion.

6. The automatic focusing device according to claim 1, further comprising:
   a first discrimination portion which discriminates whether or not a difference between illuminance detected by said sensor array for ranging and illuminance detected by said image sensor is greater than a threshold level;

a second discrimination portion which discriminates whether or not the illuminance detected by said sensor array for ranging is less than the illuminance detected by said image sensor;

wherein and said judgment portion judges that said sensor array for ranging is obstructed when said first discrimination portion discriminates that the difference between the illuminance detected by said sensor array for ranging and the illuminance detected by said image sensor is greater than the threshold value and said second discrimination portion discriminates that the illuminance detected by said sensor array for ranging is less than the illuminance detected by said image sensor.

7. The automatic focusing device according to claim 6, further comprising a warning portion which initiates a warning notification to a user;

wherein said warning portion initiates a warning notification to the user when the difference between the illuminance detected by said sensor array for ranging and the illuminance detected by said image sensor is judged to be greater than the threshold value by said first discrimination portion.

8. The automatic focusing device according to claim 7, wherein said warning portion initiates a warning notification to the user that the sensor array for ranging is obstructed when said second discrimination section discriminates that the illuminance detected by said sensor array for ranging is less than the illuminance detected by said image sensor; and wherein said warning portion initiates a warning notification to the user that the shooting lens is obstructed when said second discrimination section discriminates that the illuminance detected by said sensor array for ranging is greater than the illuminance detected by said image sensor.

9. The automatic focusing device according to claim 7, wherein said warning portion includes at least one audio warning portion which initiates a warning by audio and a display warning portion which initiates a warning by visual display.

10. The automatic focusing device according to claim 1, further comprising a fourth focus control portion which performs focus relative to an object when the judgment portion judges that said sensor array for ranging is not obstructed by driving said focus lens so that focusing relative to the object is performed by said first control portion to position the focus lens at a first focus lens position, and then driving said focus lens in a narrow range from the first focus lens position by said second focus control portion and moving said focus lens to a second focus lens position corresponding to a highest contrast value.

11. The automatic focusing device according to claim 1, further comprising a fourth focus control portion which performs focusing relative to the object when the judgment portion judges that said sensor array for ranging is not obstructed by moving said focus lens so that focusing relative to the object is performed by said first focus control portion without performing the focus control by said second focus control portion.

12. The automatic focusing device according to claim 1, wherein said third focus control portion performs focusing relative to the object when the judgment portion judges that said sensor array for ranging is obstructed by driving said focus lens by said second focus control portion without performing focus control by said first focus control portion and moving said focus lens to a lens position corresponding to a highest contrast value.

13. The automatic focusing device according to claim 1, wherein said third focus control portion performs focusing relative to the object when the judgment portion judges that said sensor array for ranging is obstructed by driving said focus lens so that focusing relative to the object is performed by said first focus control portion to move the focus lens to a first focus lens position and then driving said focus lens in a wide range from the first focus lens position by said second focus control portion and moving said focus lens to a second focus lens position corresponding to a highest contrast value.

14. An electronic camera comprising:
a phase difference detection portion which detects phase difference of an image by a sensor array for ranging;
an image pickup portion which acquires an object image of an object and outputs the acquired image;
a recording portion which records the acquired image outputted from said image pickup portion;
a contrast detection portion which detects a contrast value of the acquired image outputted from said image pickup portion;
a first focus control portion which performs focusing relative to the object by driving a focus lens based on a detection result by said phase difference detection portion;
a second focus control portion which performs focusing relative to the object by driving the focus lens based on a plurality of detection results acquired by said contrast detection portion while driving said focus lens;
a judgment portion which judges whether or not said sensor array for ranging is obstructed; and
a third focus control portion which prioritizes focus control by said second focus control portion higher than focus control by said first focus control portion when said judgment portion judges that said sensor array for ranging is obstructed.

15. An automatic focusing device comprising:
phase difference detection means for detecting phase difference of an image by a sensor array for ranging;
contrast detection means for detecting a contrast value of an image acquired by an image sensor which images an object;
first focus control means for performing focusing relative to the object by driving a focus lens based on a detection result by said phase difference detection means;
second focus control means for performing focusing relative to the object by driving the focus lens based on a plurality of detection results acquired by said contrast detection means while driving said focus lens;
judgment means for judging whether or not said sensor array for ranging is obstructed; and
third focus control means for prioritizing focus control by said second focus control means higher than focus control by said first focus control means when said judgment means judges that said sensor array for ranging is obstructed.

16. An automatic focusing method for a device that includes a sensor array for ranging and an image sensor, the method comprising:
judging whether or not the sensor array for ranging is obstructed;
prioritizing a second focus control higher than a first focus control when it is judged that said sensor for ranging is obstructed;
wherein said first focus control comprises:
detecting a phase difference of an image by the sensor array for ranging;

performing focusing relative to an object by driving a focus lens based on the detected phase difference;

wherein said second focus control comprises:

detecting a plurality of contrast values of images of the object acquired by the image sensor while driving the focus lens; and performing focusing relative to the object based on the plurality of contrast values detected while driving the focus lens.

17. A computer-readable storage medium encoded with a program that is executable by a computer to cause the computer to perform functions comprising:

a phase difference detection process for detecting phase difference of an image by a sensor array for ranging;

a contrast detection process for detecting a contrast value of an image acquired by an image sensor which images an object;

a first focus control process for performing focusing relative to the object by driving a focus lens based on a detection result by said phase difference detection process;

a second focus control process for performing focusing relative to the object by driving the focus lens based on a plurality of detection results acquired by said contrast detection process while driving said focus lens;

a judgment process for judging whether or not said sensor array for ranging is obstructed; and a third focus control process for prioritizing focus control by said second focus control process higher than focus control by said first focus control process when it is judged by said judgment process that said sensor array for ranging is obstructed.

* * * * *